Patented Oct. 2, 1951

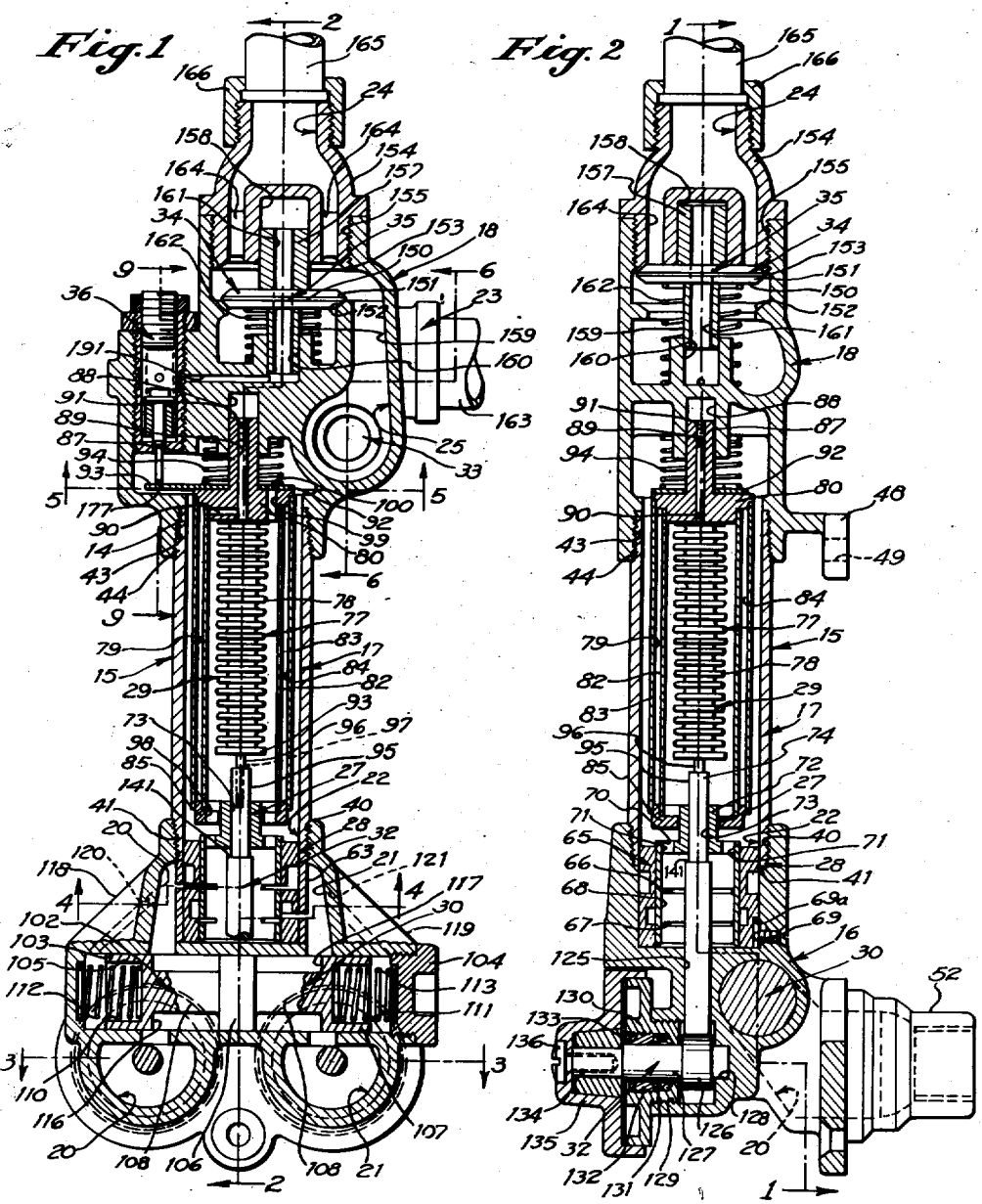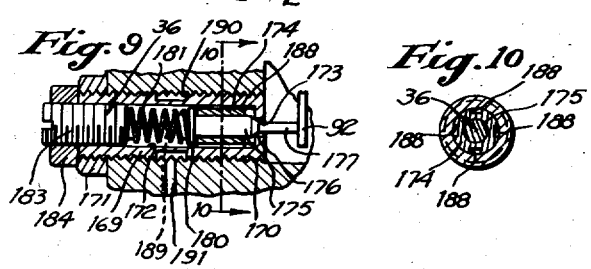

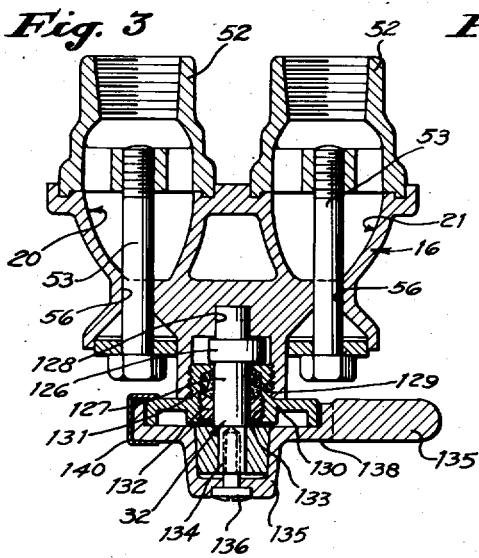

2,569,838

UNITED STATES PATENT OFFICE 2,569,838

DEVICE FOR REGULATING MIXED FLUID TEMPERATURES

Walter L. Vinson, Sherman Oaks, Calif.

Application June 17, 1946, Serial No. 677,243

12 Claims. (Cl. 236—12)

My invention relates in general to the art of regulating fluid temperatures and, more particularly, to an automatic device which is adapted to regulate the temperatures of fluids by mixing fluids of different temperatures, and which is adapted to maintain the temperature of a mixture of the fluids at a substantially constant and predetermined value.

Reference is hereby made to my application Serial No. 677,244, filed June 17, 1946, and entitled "Fluid Temperature Regulator," now abandoned, and to my application Serial No. 744,395, filed April 28, 1947, and entitled "Temperature and Flow Regulator, now Patent No. 2,526,099, dated October 17, 1950.

In general, my invention involves introducing fluids of different temperatures into a common mixing chamber in such proportions that a mixture of a predetermined temperature is produced, the proper proportions preferably being obtained by regulating the relative rates of flow of the fluids into the mixing chamber in response to the temperature of the mixture, which is a primary object of my invention.

Another object of my invention is to provide a device having inlet control means responsive to the temperature of the mixture for regulating the rate of flow of one or more of the fluids into the mixing chamber, the inlet control means preferably including mixing valve means for regulating the relative rates of flow of the fluids, and including means responsive to the temperature of the mixture for operating and regulating the position of the mixing valve means to maintain the mixture temperature at a substantially constant and predetermined value.

Still another object of the invention is to provide means for varying or adjusting the temperature at which the mixture is maintained by the inlet control means so that any desired mixture temperature may be obtained within the temperature range defined by the maximum and minimum fluid temperatures.

My present invention provides a device of the foregoing general character wherein the mixing valve means includes a mixing valve which is reciprocable in the mixing chamber to regulate the relative rates of flow of the fluids therein, the reciprocation of the mixing valve being effected by the temperature responsive means which preferably includes a thermostatic element which is adapted to expand or contract in response to variations of the mixture temperature to reciprocate the mixing valve, thus regulating the relative rates of flow of the fluids into the mixing chamber to maintain the mixture temperature substantially constant at a predetermined value. A related object is to provide such an expansible thermostatic element which is adapted to expand or contract an initial amount before moving said mixing valve so that the particular temperature at which the mixture is maintained may be adjusted by varying the amount of initial expansion or contraction of the thermostatic element.

The expansible thermostatic element preferably comprises an expansible reservoir, such as a bellows, having an operating fluid therein which is adapted to expand or contract in response to mixture temperature variations to regulate a dimension, preferably the length, of the thermostatic element, and, consequently, the operation of the mixing valve. An important object of my invention is to provide a secondary reservoir which is connected to the expansible reservoir and which is also filled with the operating fluid, the secondary reservoir preferably being an annular container which surrounds the expansible reservoir. The employment of the secondary reservoir permits the use of a large body of operating fluid so that the volume changes of the operating fluid for a given temperature change are increased, thus increasing or amplifying the amount of expansion or contraction of the expansible reservoir for a given temperature change, which is another important object of my invention. Such amplification of the amount of expansion or contraction of the expansible reservoir permits the use of a smaller reservoir and provides for more accurate and sensitive response to temperature changes.

Still another important object of my invention is the provision of a temperature regulating device which automatically diverts or by-passes the mixture until the temperature thereof approaches or is substantially equal to the predetermined value.

I prefer to provide a device of this general character having by-pass and service outlets and having outlet control means responsive to the temperature of the mixture for regulating flow of the mixture through the by-pass and service outlets, which is another object of the invention. A related object is to provide a temperature regulating device wherein the outlet control means is actuable hydraulically by the mixture in response to the temperature thereof.

A further object is the provision of outlet control means including hydraulically-actuable outlet valve means for directing the mixture through either the by-pass or service outlets, and including control valve means for regulating operation of the outlet valve means, the control valve means being actuable by means responsive to the temperature of the mixture to regulate operation of the outlet valve means in a manner such that the outlet valve means automatically directs the mixture through the by-pass outlet until the mixture temperature approaches the predetermined value and automatically directs the mixture through the service outlet only when the mixture temperature is substantially equal to the predetermined value. Thus, my invention insures that the mixture delivered at the service outlet will always be at the desired temperature.

An additional object of my invention is to provide means for regulating the inlet pressures of the fluids to minimize pressure fluctuations at the inlet control means. The pressure regulating means provides substantially constant inlet pressures at the inlet control means by compensating for inlet pressure variations, thus minimizing flow variations which would result from such pressure variations. Consequently, the inlet control means is primarily concerned with compensating for temperature fluctuations, and any compensation for pressure fluctuations by the inlet control means is minimized, thus providing for more uniform and reliable temperature regulation.

Another object of my invention is the provision of a temperature regulating device which may be operated by means of a single valve which is adapted to regulate flow of the mixture from the mixing chamber.

The foregoing objects and advantages of my invention, together with various other objects and advantages which will be evident hereinafter, may be realized by means of the exemplary embodiment which is described in detail hereinafter and is illustrated in the accompanying drawings. The embodiment illustrated is particularly adapted for regulating the temperature of a shower by mixing water from the "hot" and "cold" water lines in suitable proportions to maintain the temperature of the shower substantially constant at a predetermined value, and will be considered in this connection for convenience in disclosing the invention. However, it will be understood that the embodiment illustrated is susceptible to various other applications, and I do not intend to be limited to the particular application considered hereinafter.

Referring to the drawings, which are intended as illustrative only:

Fig. 1 is a sectional view of a temperature regulating device which embodies the fundamental principles of my invention, and which is taken along the broken line 1—1 of Fig. 2 in the direction indicated by the arrows contiguous thereto;

Fig. 2 is a sectional view thereof which is taken along the broken line 2—2 of Fig. 1 in the direction indicated by the arrows contiguous thereto;

Figs. 3, 4, and 5 are sectional views which are taken along the broken lines 3—3, 4—4, and 5—5, respectively, of Fig. 1;

Fig. 6 is a fragmentary sectional view which is taken along the broken line 6—6 of Fig. 1 in the direction indicated by the arrows contiguous thereto;

Fig. 7 is a sectional view which is taken along the broken line 7—7 of Fig. 6;

Fig. 8 is a fragmentary sectional view of a mixing valve means;

Fig. 9 is an enlarged, sectional view of a control valve means which is taken along the broken line 9—9 of Fig. 1;

Fig. 10 is a sectional view of the control valve means which is taken along the broken line 10—10 of Fig. 9; and Fig. 11 is a utility view illustrating a shower installation which incorporates the temperature regulator.

Referring particularly to Figs. 1 and 2 of the drawings, the temperature regulating device includes a casing or housing 15 which is formed in three major sections in the particular construction illustrated, for convenience in manufacturing the device. The housing 15 includes an inlet section or inlet manifold 16, a cylindrical intermediate or mixing section 17, and an outlet section or outlet manifold 18, the inlet manifold having inlets or inlet passages 20 and 21 therein which communicate with a cylindrical mixing chamber 22 in the mixing section, and the outlet manifold having a by-pass outlet 23 and a service outlet 24 therein which communicate with the mixing chamber through an outlet passage 25. The device includes inlet control means 27 disposed in the mixing chamber 22 for regulating flow of the fluids into the mixing chamber from the inlets 20 and 21 in response to the mixture temperature, the inlet control means including reciprocable mixing valve means 28 for regulating flow of the fluids into the mixing chamber, and including means 29 responsive to the temperature of the mixture in the mixing chamber for operating the mixing valve means to maintain the mixture temperature substantially constant at a predetermined value. The device is preferably provided with means 30 for regulating the pressures of the fluids in the inlets 20 and 21 to minimize any flow variations through the mixing valve means 28 which would otherwise result from inlet pressure fluctuations, thereby reducing the temperature compensation required of the temperature responsive means 29. In order to permit variations of the predetermined mixture temperature, I prefer to provide means 32 associated with the temperature responsive means 29 for varying or adjusting the temperature at which the mixture is maintained by the temperature responsive means.

In order to regulate the rate at which the fluid mixture is delivered by the temperature regulating device, the device is preferably provided with service valve means 33 for regulating the rate of flow of the mixture through the outlet passage 25, the service valve means being manually operable in the particular construction illustrated. The mixture flowing through the outlet passage 25 is directed through either the by-pass outlet 23 or the service outlet 24 by outlet control means 34 in response to the mixture temperature, the mixture being diverted through the by-pass outlet unless the temperature thereof is substantially equal to the predetermined value. The outlet control means 34 includes hydraulically-actuable outlet valve means 35 for directing the mixture through either the by-pass or service outlets 23 or 24, the operation of the outlet valve means being regulated by control means, or control valve means 36 in response to the mixture temperature. The control valve means 36 is preferably actuated by the temperature responsive means 29 to simplify the construction of the device, although it will be understood that separate temperature responsive means (not shown) may be employed for actuating the control valve means if desired.

Considering the construction of the temperature regulating device in more detail, the inlet manifold 16 is provided with a bore 40 therein which receives an end 41 of the mixing section 17 of the housing 15, the inlet manifold and mixing section being threadedly interconnected. The outlet manifold 18 is provided with a bore 43 therein which receives the other end 44 of the mixing section 17, the outlet manifold and mixing section being threadedly interconnected. For convenience in mounting the temperature regulating device on any suitable supporting structure such as a wall (not shown), the outlet manifold 18 may be provided with one or more attachment flanges 48 each having a hole 49 therethrough for a bolt or the like as best shown in Fig. 2.

Fluids of different temperatures are introduced into the mixing chamber 22 through the inlet passages 20 and 21, the fluid having the higher temperature, i. e., the "hot" fluid, being introduced into the inlet 20 in the particular construction illustrated, and the fluid having the lower temperature, i. e., the "cold" fluid, being introduced into the inlet 21. The fluids may be introduced into the inlets 20 and 21 through inlet fittings 52 which may be connected to suitable fluid supply lines 54 and 55 shown in Fig. 11, in the usual manner, the inlet fittings being secured to the inlet manifold 16 by bolts 53 as best shown in Fig. 3. The bolts 53 extend through openings 56 in the inlet manifold 16 and are threadedly inserted in openings in the fittings 52 as is well known in the art.

As best shown in Fig. 8, a tubular sleeve or bushing 57 is disposed in the mixing chamber 22, the bushing having a relatively wide annular groove or inlet 58 in the outer surface thereof, and a similar annular groove or inlet 59 in the inner surface thereof. The bushing 57 is provided with a pair of relatively narrow inlets or inlet slots 60 therethrough which communicate with the annular groove 58, and is provided with a relatively narrow slot 61 therethrough which communicates with the annular groove or inlet 59.

As best shown in Fig. 8, the mixing section 17 is provided with a pair of relatively narrow, transverse slots 62 and 63 therethrough, the slot 62 being adapted to provide fluid communication between the inlet 20 and the mixing chamber 22 through the annular groove 58 and inlets 60, and the slot 63 being adapted to provide fluid communication between the inlet 21 and the mixing chamber through the slot 61 and the annular groove or inlet 59. The mixing valve means 28 includes a hollow, cyclindrical mixing valve 65 which is reciprocably disposed in the tubular bushing 57. The annular grooves or inlets 58 and 59 in the bushing 57 permit the hot fluid from the inlet 20 and the cold fluid from the inlet 21, respectively, to circulate entirely around the mixing valve 65 so that the net lateral forces exerted thereon by the pressures of these fluids are equal to zero. This balanced construction minimizes friction on the mixing valve 65 and insures smooth operation thereof, which is an important feature of my invention.

As best shown in Fig. 8, the mixing valve 65 is provided with a pair of narrow, elongated, transverse ports or slots 66 therein, and a pair of similar ports or slots 67 therein, all of which communicate with the interior 68 thereof. The ports 66 are adapted to register with the inlets 60 to admit hot fluid from the inlet 20 into the mixing chamber 22, and the ports 67 are adapted to register with the inlet 59 to admit cold fluid from the inlet 21 into the mixing chamber. As best shown in Fig. 2, a screw 69 extends through the inlet manifold 16 into a longitudinal slot 69a in the mixing valve 65 to prevent rotation of the mixing valve during reciprocation thereof. As will be apparent from Fig. 8, the relative positions of the inlets 60 and 59 and ports 66 and 67, respectively, are such that when the ports 66 fully register with the inlets 60, the ports 67 are just out of registry with the inlet 59, and when the ports 67 fully register with the inlet 59, the ports 66 are just out of registry with the inlets 60. This arrangement of the inlets 60 and 59 and the ports 66 and 67, together with the elongated configuration thereof, provides extremely sensitive regulation of the relative rates of flow of the hot and cold fluids since the mixing valve 65 need be moved through only a very small distance by the temperature responsive means 29 to change the relative rates of flow of the hot and cold fluids appreciably. Thus, if the mixture temperature fluctuates because of variations of the temperature of either the hot or cold fluid, or because of variations of the flow rate of either fluid which result from inlet pressure variations, the temperature responsive means 29 need move the mixing valve 65 through only a small distance to compensate for such mixture temperature fluctuations, thus insuring sensitive and rapid regulation of the mixture temperature.

Considering the construction of the mixing valve means 28 in more detail, the mixing valve 65 includes an end wall 70 which is provided with a plurality of openings or ports 71 therein which permit the mixed fluids in the interior 68 of the mixing valve to flow therefrom into that portion of the mixing chamber 22 which contains the temperature responsive means 29. The end wall 70 of the mixing valve 65 is provided with a projection or boss 72 thereon having a bore 73 therethrough for a reciprocable rod member or plunger 74 which forms part of the temperature adjusting means 32 as will be described in detail hereinafter.

The temperature responsive means 29 includes an expansible thermostatic element 77 which is adapted to expand or contract longitudinally in response to variations of the mixture temperature, the thermostatic element preferably including an expansible reservoir 78, such as the bellows illustrated, having an operating fluid therein which is adapted to expand or contract in response to the mixture temperature to regulate the length of the expansible reservoir. Any desired operating fluid may be employed, the operating fluid preferably having a relatively high coefficient of expansion. The temperature responsive means 29 also includes a secondary reservoir 79 which is connected to the expansible reservoir 78 by a head member or fitting 80 which provides fluid communication therebetween, the secondary reservoir also being filled with the operating fluid. As best shown in Fig. 1, the secondary reservoir 79 includes a pair of concentric tubular members 82 and 83 having an annular space 84 therebetween for the operating fluid, the tubular members being secured to the fitting 80 and to another fitting 85 which is attached to the boss 72 on the mixing valve 65.

The fitting 80 is provided with a boss 87 thereon which is slidably disposed in a longitudinal bore 88 in the outlet manifold 18, the fitting having a longitudinal bore 89 therethrough which communicates with the expansible reservoir 78. As best shown in Fig. 1, the fitting 80 is also provided with a passage 90 therein which communicates with the secondary reservoir 79 and the bore 89 to provide fluid communication between the expansible reservoir 78 and the secondary reservoir. The expansible reservoir 78 and secondary reservoir 79 may be filled with the operating fluid through the bore 89 during assembly of the temperature regulating device, the bore then being sealed in any suitable manner, as by a plug 91.

As best shown in Figs. 1 and 5, a plate member 92 is mounted on the fitting 80 and encircles the boss 87 thereon, the plate member being provided with an arm 93 which is adapted to actuate the control valve means 36 as will be described in detail hereinafter. In the particular construction illustrated, a spring 94 encircles the boss 87 on the fitting 80 and is seated against the outlet manifold 18 and the plate member 92, the spring being adapted to urge the mixing valve 65 downwardly as viewed in Fig. 1.

As best shown in Fig. 1, one end of the thermostatic element 77 is secured to an end member 95 having a stem 96 which is slidably disposed in a bore 97 in the plunger 74. The relative lengths of the stem 96 and bore 97 are such that the end member 95 may move relative to the plunger 74 as the thermostatic element 77 expands and contracts, and may engage the plunger 74 after the element has expanded a predetermined amount for reasons to be discussed hereinafter.

In order to admit the mixture into the annular space between the expansible reservoir 78 and the secondary reservoir 79, the fitting 85, which is attached to the mixing valve 65, is provided with a plurality of ports 98 therein as best shown in Fig. 1. The fitting 80 is provided with a plurality of ports 99 therein, only one of which is shown in Fig. 1, to permit the mixture to flow from the annular space between the reservoirs 78 and 79, the plate member 92 being provided with a plurality of ports 100, best shown in Fig. 5, which register with the ports 99.

In order to describe the operation of the mixing valve means 28 and the temperature responsive means 29, the following operating conditions will be assumed for convenience: (1) the operating fluid in the reservoirs 78 and 79 is adapted to expand in response to temperature increases; (2) the temperature of the hot fluid introduced into the mixing chamber 22 through the inlet 20 is normally above ambient air temperature; and (3) the temperature regulating device is either being put into operation for the first time, or is being put into operation after an appreciable time interval has elapsed since the preceding use thereof, so that the temperature of the hot fluid in the inlet 20 and supply line 54 is less than the normal temperature thereof and may be substantially equal to the ambient air temperature. It will be understood that these operating conditions have been assumed for illustrative purposes only, and I do not intend to be limited thereto.

Prior to putting the temperature regulating device into operation by opening the service valve means 33 as will be described hereinafter, the expansible thermostatic element 77 will be in a position such as that shown in Fig. 1. The mixing valve 65 will also be in the position shown in Fig. 1 so that the hot fluid ports 66 register with the hot fluid inlets 60, and so that the cold fluid ports 67 are just out of registry with the cold fluid inlet 59, the mixing valve being held in this position by the spring 94. Consequently, upon opening the service valve means 33, no cold fluid can enter the mixing chamber 22 from the cold fluid inlet 21, the only fluid entering the mixing chamber being the fluid at reduced temperature from the hot inlet 20. As this "cold" fluid in the hot fluid inlet 20 and supply line 54 is displaced by hot fluid from the source of hot fluid supply (not shown), the temperature of the fluid entering the mixing chamber 22 gradually increases, thus causing the expansible thermostatic element 77 to expand by expanding the operating fluid in the reservoirs 78 and 79. This expansion of the operating fluid expands the thermostatic element 77 an initial amount to increase the length thereof so that the end member 95 engages the plunger 74, the position of the plunger being fixed by the temperature adjusting means 32 as will be described hereinafter. Since the initial expansion of thermostatic element 77 is limited by the plunger 74, further expansion thereof results in movement of the valve member 65 against the spring 94, the movement of the valve member being upward as viewed in Fig. 1. Consequently, the cold fluid ports 67 begin to register with the cold fluid inlet 59 to admit cold fluid into the mixing chamber 22. Thereafter, the expansible thermostatic element 77 regulates the position of the mixing valve 65 to regulate the relative rates of flow of the hot and cold fluids into the mixing chamber so that the mixture temperature is maintained substantially constant at the predetermined value.

It will be apparent that as the mixture of the hot and cold fluids leaves the mixing valve 65 and flows through the ports 71 into that portion of the mixing chamber 22 which contains the temperature responsive means 29, part of the mixture flows upwardly, as viewed in Fig. 1, through the annular space between the secondary reservoir 79 and the walls of the mixing chamber. The remainder of the mixture enters the annular space between the reservoirs 78 and 79 through the ports 98, and flows through the annular space and out through the ports 99 and 100. Thus, substantially the entire surface area of the reservoirs 78 and 79 is exposed to the mixture to insure rapid response to any mixture temperature variations.

The secondary reservoir 79 provides means for amplifying the expansion or contraction of the expansible thermostatic element 77, since as the operating fluid in the expansible reservoir 78 and the secondary reservoir expands, for example, some of the operating fluid in the secondary reservoir is displaced and flows through the passage 90 into the expansible reservoir to amplify the expansion of the thermostatic element. Similarly, as the operating fluid contracts, the volume of the operating fluid in the secondary reservoir 79 decreases to provide space for some of the operating fluid in the expansible reservoir 78, thereby amplifying the resulting contraction of the expansible thermostatic element 77. This construction insures that the thermostatic element 77 will respond accurately to even very small mixture temperature variations to provide an extremely sensitive temperature regulating device.

It will be apparent that the thermostatic element 77 will control the mixing valve 65 to compensate for any mixture temperature variations regardless of the cause of such variations, thus maintaining the mixture temperature substantially constant at the predetermined value. Such mixture temperature variations may be due either to fluctuations of the temperatures of the hot and/or cold fluids, or to fluctuations of the inlet pressures of the hot and/or cold fluids which result in fluctuating flow rates through the inlets 60 and 59 and ports 66 and 67, respectively. Although the thermostatic element 77 will actuate the mixing valve 65 to maintain the mixture temperature substantially constant regardless of whether the temperatures or inlet pressures of the fluids fluctuate, I prefer to compensate for inlet pressure fluctuations with the pressure regulating means 30 as will be described in detail in the following paragraphs so that the functions of the thermostatic element are reduced to compensating for temperature fluctuations only.

The pressure regulating means 30 includes a shuttle valve 102 which is reciprocable in a bore 103 in the inlet manifold 16, the bore extending transversely of and communicating with the inlets 20 and 21 and being closed by a plug member 104. The shuttle valve 102 includes three spaced piston or plunger-like elements 105, 106, and 107 which are interconnected by rods 108. The piston elements 105 and 107 are recessed at 110 and 111, respectively, to receive springs 112 and 113, respectively, which are seated against the base wall of the bore 103 and against the plug member 104, respectively, the springs being adapted to urge the shuttle valve toward a central or neutral position. However, the shuttle valve 102 may also be used without the springs 112 and 113, if desired. The piston elements 105 and 106 provide a passage 116 therebetween which is adapted to register with the inlet 20, and the piston elements 106 and 107 provide a passage 117 therebetween which is adapted to register with the inlet 21. As best shown in Figs. 1 and 4, the inlet manifold 16 is provided with a pair of web portions 118 and 119, the latter being provided with passages 120 and 121 therein, respectively, which communicate with the inlets 20 and 21, respectively, and communicate with the bore 103 behind the piston elements 105 and 107, respectively, to regulate the position of the shuttle valve in the bore. It will be apparent that any difference between the inlet pressures which are applied to the piston elements 105 and 107 by the hot and cold fluids in the inlets 20 and 21, respectively, will regulate the position of the shuttle valve 102 in the bore 103 since the pressures are applied to the shuttle valve in opposite directions. Thus, the shuttle valve 102 will regulate the degrees to which the passages 116 and 117 register with the inlets 20 and 21 in response to fluctuations in the relative inlet pressures of the hot and cold fluids to equalize the pressures thereof at the mixing valve means 28. If, for example, the inlet pressure of the cold fluid in the inlet 21 should decrease for any reason, the shuttle valve 102 will move to the right as viewed in Fig. 1, in response to the decreased pressure on the piston element 107, to increase the resistance offered by the shuttle valve to the flow of the hot fluid and to reduce the resistance to the flow of the cold fluid, thereby equalizing the pressures of the hot and cold fluids at the mixing valve means 28. Thus, the pressures of the hot and cold fluids at the mixing valve means 28 are maintained equal at all times so that the relative rates of flow of the hot and cold fluids into the mixing chamber 22 are not affected by inlet pressure fluctuations. Consequently, the mixture temperature will not be affected by inlet pressure variations and the only function of the temperature responsive means 29 is to compensate for any temperature variations of the hot and/or cold fluids, thereby permitting the temperature responsive means to operate under more stable conditions to insure more accurate mixture temperature regulation. Moreover, it will be apparent that by employing springs 112 and 113 which may be deflected sufficiently, if the springs 112 and 113 are employed, the shuttle valve 102 may be employed as a shut-off if desired in the event of failure of either the hot or cold fluid supply. If the cold fluid supply should fail, for example, the piston element 105 will completely close the hot fluid inlet 20, thus preventing the hot fluid from flowing into the mixing chamber 22 and then flowing back into the cold fluid inlet 21.

The discussion thus far has disclosed how the temperature regulating device maintains the temperature of the mixture constant at one particular predetermined value. In order to permit varying the temperature at which the mixture is maintained, I prefer to employ the temperature adjusting means 32, the details of which are best shown in Figs. 2 and 3. The temperature adjusting means includes the plunger 74 which is slidably disposed in a bore 125 in the inlet manifold 16, the plunger being reciprocable by means of a cam 126 on a shaft member 127 which is journaled in a counterbore 128 in the inlet manifold. The inlet manifold 16 is provided with a bore 129 having a fitting 130 threadedly inserted therein, the fitting serving to retain the shaft member 127. Leakage of the mixture from the mixing chamber 22 around the shaft member 127 is prevented by packing 131, the packing being retained by a collar 132 which is threaded into a bore 133 in the fitting 130. The shaft member 127 is provided with an end 134 having an adjusting handle 135 mounted thereon and attached thereto by a screw 136. The adjusting handle 135 includes a scale or dial portion 138 having indicia 139 thereon, as best shown in Fig. 11, which represent various predetermined mixture temperatures, the particular predetermined temperature for which the temperature adjusting means 32 is set being indicated by a pointer 140.

Whenever it is desired to change the temperature at which the mixture is maintained, it is merely necessary to rotate the adjusting handle 135 until the pointer 140 indicates the desired temperature. Rotating the handle 135 causes the cam 126 to displace the plunger 74, thus regulating the position of the plunger with respect to the thermostatic element 77 to adjust the temperature at which the mixture is maintained. Consequently, the position of the plunger 74 determines the length of the thermostatic element 77 at the instant it begins to displace the mixing valve 65. Since the length of the thermostatic element 77 is proportional to the mixture temperature, it will be apparent that the length of the thermostatic element at approximately the instant it begins to move the mixing valve 65 determines the temperature at which the mixture is maintained.

Assuming for convenience that the thermostatic element 77 is adapted to expand in response to a mixture temperature increase as in the construction illustrated, if the plunger 74 is moved downwardly, as viewed in Fig. 1, the thermostatic element must expand a greater amount so that it is sufficiently long to engage the plunger in the new position, which corresponds to a higher mixture temperature. Consequently, the mixing valve 65 will not be displaced to open the cold fluid ports 67 until the thermostatic element 77 has expanded sufficiently to engage the plunger 74 in the new position, thus resulting in a higher mixture temperature. Similarly, if the amount of initial expansion is decreased by moving the plunger 74 upwardly, as viewed in Fig. 1, the thermostatic element 77 will expand sufficiently to begin to close the hot fluid ports 66 and open the cold fluid ports 67 at a lower mixture temperature. Thus, the temperature at which the mixture is maintained by the thermostatic element 77 may be adjusted by adjusting the amount of initial expansion thereof in the particular construction shown.

The temperature adjusting means 32 is also adapted to permit manual regulation of the mixture to a certain extent to obtain a mixture temperature which is equal to the temperature of the cold fluid in the cold fluid inlet 21 by closing the hot fluid ports 66 and fully opening the cold fluid ports 67 manually, this feature being particularly applicable to a shower installation in the event that a "cold" shower, i. e., a shower temperature equal to the temperature of the cold fluid in the cold inlet 21, is desired. To permit such manual temperature regulation, the plunger 74 is provided with a shoulder 141 thereon which is normally spaced from the wall 70 of the mixing valve 65, as best shown in Fig. 2. If a mixture temperature equal to the temperature of the cold fluid in the inlet 21 is desired, it is merely necessary to rotate the adjusting handle 135 until the shoulder 141 of the plunger 74 engages the wall 70 of the mixing valve 65 and displaces the mixing valve sufficiently to close the hot fluid ports 66 and to bring the cold fluid ports 67 into complete registry with the relatively wide cold fluid inlet 59, the purpose of the relatively wide inlet 59 being to insure the flow of cold fluid from the inlet 21 for a wide range of positions of the mixing valve during manual temperature regulation. Thus, only cold fluid from the cold fluid inlet 21 may flow into the mixing chamber 22, the temperature responsive means 29 being inoperative when the plunger 74 is in this position. It will be apparent that, when the mixing valve 65 is displaced in this manner to close the hot fluid ports 66, the arm 93 on the plate member 92 is also displaced to actuate the control valve means 36, which then actuates the outlet valve means 35 to permit the mixture to flow through the service outlet 24, as will be described in detail hereinafter.

After leaving the mixing chamber 22, the mixture at the predetermined temperature flows through the service valve means 33 and into the outlet passage 25. As best shown in Figs. 6 and 7, the service valve means 33 may include an ordinary ratatable valve member 145 which is adapted to engage a seat 146 to prevent flow into the outlet passage 25, the valve member being rotatable manually in the construction illustrated by means of a handle 147 to regulate flow of the mixture. Thus, the rate of flow through the temperature regulating device is regulated by the single valve member 145 by regulating the rate of flow of the mixture from the mixing chamber 22.

From the outlet passage 25, the mixture may flow through either the by-pass outlet 23 or the service outlet 24, the direction being determined by the outlet control means 34. As best shown in Figs. 1 and 2, the outlet valve means 35, which is part of the outlet control means 34, includes a reciprocable outlet valve 150 having an annular flange 151 which is adapted to seat against either of a pair of valve seats 152 and 153, the valve seat 152 being formed in the outlet manifold 18 and the valve seat 153 being formed on a fitting 154 which is threadedly inserted in a bore 155 in the outlet manifold. The outlet valve includes a plunger 157 which is operable in a cup or cylinder 158 formed in the fitting 154, and includes a second plunger or stem 159 which is operable in a bore 160 in the outlet manifold 18, the outlet valve being provided with a longitudinal bore 161 therethrough for a reason to be discussed hereinafter. The stem 159 is encircled by a spring 162 which normally holds the annular flange 151 of the outlet valve 150 against the valve seat 153 as shown in Fig. 2, to close the service outlet 24 so that the mixture flows from the outlet passage 25 into the by-pass outlet 23, a by-pass line 163 being connected to the by-pass outlet to dispose of the mixture flowing therethrough. As will be described in detail hereinafter, the control valve means 36 is adapted to displace the outlet valve 150 into the position shown in Fig. 1 to close the by-pass outlet 23 so that the mixture flows through the service outlet 24, passages 164 being provided in the fitting 154 to permit the mixture to flow past the cylinder 158. A service line 165 is threadedly connected to the fitting 154 by a fitting 166, the service line leading to the point where the mixture is to be used.

The control valve means 36 may conveniently be considered in connection with a specific illustration of the operation of the outlet control means 34, it being understood that I do not intend to be limited to the particular illustration employed hereinafter. For example, if the temperature regulating device is put into operation for the first time, or is used after a considerable time interval has elapsed since the preceding use thereof, the temperature of the hot fluid in the inlet 20 and the supply line 54, and the temperature of the mixture in the mixing chamber 22 may be approximately equal to the ambient air temperature. Consequently, when the service valve means 33 is opened, the fluid leaving the mixing chamber 22 will be "cold" until displaced by hot fluid from the hot fluid supply line 54. Normally, the outlet valve 150 is in the position shown in Fig. 2 so that the fluid leaving the mixing chamber 22 is diverted into the by-pass outlet 23 and is disposed of in any suitable manner. The function of the control means 36 is to admit part of the mixture into the cylinder 158 through the bore 160 in the outlet valve 150 so that the mixture will act on the plunger 157 to displace the outlet valve into the position shown in Fig. 1 when the mixture temperature reaches, or substantially reaches, the predetermined value, thus closing the by-pass outlet 23 and opening the service outlet 24 when the predetermined mixture temperature has been attained.

Considering the details of the control means 36, which are best shown in Figs. 1, 9, and 10, the control means includes a valve body 169 which is threadedly inserted in a bore 170 in the outlet manifold 18 and is retained by a lock nut 171, the valve body being provided with a bore 172 therein, and being provided with a port 173 therein which communicates with the bore 172 and with the mixing chamber 22. A valve member 174 is disposed in the bore 172 and is provided with a slidable stem 175 having a tapered shoulder 176 thereon which is adapted to seal the port 173, the stem having a reduced portion 177 which extends through and is smaller than the port so that part of the mixture from the mixing chamber 22 may flow around the reduced portion and into the bore 172 when the port is not sealed by the shoulder 176. The stem 175 is provided with a head 180 thereon which serves as a seat for a spring 181 which normally urges the stem to the right, as viewed in Fig. 9, so that shoulder 176 seals the port 173, the spring being seated against a plug 183 which is threaded into the bore 172 and is secured by a lock nut 184.

Assuming that all of the fluid in the hot fluid inlet 20 and supply line 54 which is at too low a temperature has been displaced by hot fluid after the service valve means 33 has been opened, fluid at the proper temperature will begin to enter the mixing chamber 22 through the hot fluid inlets and ports 60 and 66, which are in complete registry. As the mixture temperature increases to the predetermined value for which the temperature adjusting means 32 is set because of the introduction of hot fluid into the mixing chamber 22, the mixing valve 65 will be displaced by the thermostatic element 77 to open the cold fluid ports 67 and close the hot fluid ports 66 the amounts required to maintain the mixture temperature at the predetermined value. Such displacement of the mixing valve 65 is communicated to the plate member 92 so that the arm 93 engages the reduced portion 177 of the stem 175 of the control valve means 36, as best shown in Fig. 1, thus displacing the stem to open the port 173 to permit part of the mixture in the mixing chamber 22 to enter the bore 172 in the valve body 169 as the mixture temperature approaches or substantially equals the predetermined value. The mixture in the bore 172 flows through passages 188 in the valve member 174 and through openings 189 in the valve body 169 into an annular groove 190 therein. From the annular groove 190, the mixture flows through a passage 191 in the outlet manifold 18, as best shown in Fig. 1, and then into the cylinder 158 through the bore 160 in the outlet valve 150. The pressure of the mixture is thus applied to the plunger 157 to displace the outlet valve 150 into the position shown in Fig. 1 so that the mixture is directed into the service outlet 24.

Thus, it will be apparent that the mixture will be diverted through the by-pass outlet 23 until all of the "cold" fluid in the hot fluid inlet 20 and all of the "cold" mixture in the mixing chamber 22 have been displaced and the predetermined mixture temperature has been attained. Once the predetermined mixture temperature has been attained, the thermostatic element 77 actuates the control valve means 36 which then supplies the mixture to the cylinder 158 to actuate the outlet valve 150, thus diverting the mixture from the by-pass outlet 23 to the service outlet 24. Consequently, the mixture is not directed through the service outlet 24 until the temperature of the mixture has been increased to, or substantially to, the value determined by the temperature adjusting means 32. Although I have described the operation of the outlet control means 34 in connection with the case wherein the fluid in the hot fluid inlet 20 and supply line 54 and the mixture in the mixing chamber 22 are "cold," it will be apparent that similar results may be obtained in the case wherein the fluid in the cold fluid inlet 21 and supply line 54 and the mixture in the mixing chamber are "hot" by reversing the operation of the control valve means 36.

When use of the temperature regulating device is terminated by closing the service valve means 33, some of the mixture will be in the service outlet 24 and in the service line 165, above the outlet valve 150 if the device is mounted vertically as shown in the drawings, it being understood, however, that the device need not be mounted in a vertical position. If the outlet valve 150 were displaced to the position shown in Fig. 2 by the spring 162 immediately after the service valve means 33 is closed, the mixture in the service outlet 24 and the service line 165 above the outlet valve 150 would be trapped and eventually would assume the ambient air temperature so that the initial flow during subsequent operation of the device would be either too hot or too cold depending upon whether the desired mixture temperature is above or below the ambient air temperature. Assuming that the desired mixture temperature is above ambient air temperature, for example, the initial flow during subsequent operation would be too cold.

However, the operation of the outlet control means 34 is such that the outlet valve 150 does not assume the position shown in Fig. 2 immediately after the service valve means 33 is closed, but moves slowly from the position shown in Fig. 1 to that shown in Fig. 2 so that all of the mixture above the outlet valve may flow downwardly and out through the by-pass outlet 23 before the outlet valve reaches the position shown in Fig. 2. Consequently, no fluid remains above the outlet valve 150, thus preventing an initial flow at the wrong temperature during subsequent operation.

In considering the operation of the outlet control means 34 as the outlet valve 150 is displaced from the position shown in Fig. 1 to that shown in Fig. 2, it is convenient to assume the case wherein the desired mixture temperature is above ambient air temperature. It will be apparent that the thermostatic element 77 will contract slowly so that the arm 93 disengages the reduced portion 177 of the stem 175 of the control valve means 36 as the temperature of the mixture in the mixing chamber 22 decreases slowly. As the arm 93 disengages the stem 175, the spring 181 causes the shoulder 176 on the stem to seal the port 173, thus terminating communication between the mixing chamber 22 and the outlet passage 25. Consequently, the mixture in the cylinder 158 will leak past the plunger 157 slowly to permit the outlet valve 150 to open the by-pass outlet 23, there being sufficient clearance between the plunger and the walls of the cylinder to permit leakage at a small rate. Thus, the mixture in the service line 165 flows past the outlet valve 150 and through the by-pass outlet 23 before the outlet valve reaches the position shown in Fig. 2 so that none of the mixture is trapped in the service line.

In Fig. 11, I show an application of the temperature regulating device to a shower installation wherein a shower head 195 is connected to the service line 165. In the particular shower installation shown, check valves 196 are connected in the hot and cold water supply lines 54 and 55 to prevent flow of hot water into the cold line, or vice versa, in the event of failure of either the cold or hot water supply. Although the mixing valve 65 and the shuttle valve 102 are adapted to perform this function as previously mentioned, I prefer to employ the check valves 196 in order to avoid the close tolerances which would be necessary if either the mixing or shuttle valves were relied upon. Such close tolerances would not only increase manufacturing costs, but would increase friction, thus reducing the sensitiveness of operation of the mixing valve and shuttle valve in response to temperature and pressure fluctuations, respectively.

Anyone desirous of taking a shower need only open the service valve means 33 and rotate the temperature adjusting handle 135 until the pointer 140 indicates the desired temperature. No water will be delivered to the shower head 195 until the temperature of the mixture is substantially equal to the desired value, so that it is unnecessary to wait outside the shower until all of the "cold" water in the device and in the hot water supply line 54 has been displaced by hot water as is the case with ordinary shower installations. All of the water is diverted into the by-pass line 163, which may be connected to the shower drain if desired, until the temperature attains the desired value before any water is delivered to the shower head 195.

After the mixture in the mixing chamber 22 attains the proper temperature, the temperature responsive means 29 actuates the control valve means 36 to admit water to the outlet valve means 35 so that the outlet valve means closes the by-pass outlet 23 and opens the service outlet 24 to deliver water at the proper temperature to the shower head 195. The temperature responsive means 29 actuates the mixing valve means 28 to compensate for any fluctuations of the hot and cold water temperatures, thus maintaining the mixture temperature at the proper value. If the inlet pressure in either of the supply lines 54 and 55 should vary, the pressure regulating means 30 compensates for such pressure variations to maintain equal hot and cold water pressures at the mixing valve means 28, thus limiting the function of the temperature responsive means to compensate for temperature fluctuations and making for more accurate and sensitive regulation.

Such pressure variations are likely to occur frequently and at inopportune moments and may be dangerous in ordinary shower installations if the cold water supply should suffer a pressure drop because of the sudden application of another load on the cold water line, such as a load resulting from turning on a lawn sprinkler system, for example. In ordinary shower installations, such cold water pressure drops may increase the shower temperature to a dangerously high value due to the sudden reduction of the cold water flow rate.

My invention prevents such rises in the shower temperature even if the cold water supply should fail completely for any reason, either the inlet control means 27 or the pressure regulating means 30 being adapted to shut off the hot water supply almost instantaneously if the cold water supply should fail. Considering the inlet control means 27 in this connection, a failure of the cold water supply would result in a sudden increase in the temperature of the mixture in the mixing chamber 22. Consequently, the temperature responsive means 29 would compensate for this mixture temperature rise by opening the cold water ports 67 and closing the hot water ports 66 of the mixing valve 65, thus shutting off the hot water. Similarly, a failure of the cold water supply would result in the application of zero pressure to the piston element 107 of the shuttle valve 102 so that the pressure of the hot water would cause the piston element 105 to block the hot water inlet 20, thus shutting off the hot water. Thus, either the inlet control means 27 or the pressure regulating means 30 may be relied upon to shut off the hot water should the cold water fail, thereby providing an important safety feature.

In the event that a person using the shower desires to take a cold shower, or desires to finish with a cold shower after taking a hot shower, it is merely necessary to rotate the adjusting handle 135 sufficiently to close the hot ports 66 and open the cold ports 67 by displacing the mixing valve 65 manually, as previously described, so that the temperature responsive means 29 is inoperative. The control valve means 36 is actuated simultaneously in the manner previously described to operate the outlet valve means 35 so that the water in the mixing chamber, which is now at the temperature of the cold water in the inlet 21, may flow through the service outlet 24 to the shower head 195 instead of being diverted through the by-pass outlet 25.

Although I have discussed a specific application of my invention to a shower installation, I do not intend to be limited thereto since the invention is susceptible to various installations wherein temperature regulation, or flow regulation in response to temperature, are required. Moreover, I do not intend to be limited to the specific construction of the embodiment disclosed herein since various changes, modifications, and substitutions may be incorporated therein without departing from the spirit of the invention. Consequently, I hereby reserve the right to the protection afforded by the full scope of my appended claims.

I claim as my invention:

1. In a device for mixing fluids of different temperatures and for controlling the temperature and discharge of a mixture of the fluids, the combination of: a housing providing respective inlets for the fluids of different temperatures and providing by-pass and service outlets for the mixture; thermostatic means associated with said inlets for controlling the relative flows of said fluids through said inlets to produce a mixture of controlled temperature; adjustment means operatively associated with said thermostatic means for changing said controlled temperature; and outlet control means operatively associated with said thermostatic means for delivering said mixture to said by-pass outlet until the same is at a temperature differing from said controlled temperature by a predetermined amount, and for then flowing said mixture through said service outlet, said outlet control means including a hydraulically-actuable outlet valve which is movable from a first position wherein it closes said service outlet and opens said by-pass outlet to a second position wherein it opens said service outlet and closes said by-pass outlet, and said outlet control means further including control valve means actuable by said thermostatic means for applying the pressure of said mixture to said outlet valve to move same from said first to said second position.

2. In a device for mixing fluids of different temperatures and for controlling the temperature of a mixture of the fluids, the combination of: a housing provided with inlets for the fluids and provided with by-pass and service outlets for the mixture; inlet control means responsive to the temperature of the mixture for regulating the relative rates of flow of the fluids into said housing; and outlet control means responsive to the temperature of the mixture for regulating flow of the mixture through said by-pass and service outlets, said outlet control means including on outlet valve which is actuable by the mixture, and including control valve means for applying the pressure of the mixture to said outlet valve.

3. In a device for mixing fluids of different temperatures and for controlling the temperature of a mixture of the fluids, the combination of: a housing provided with inlets for the fluids and provided with by-pass and service outlets for the mixture; inlet control means, including inlet valve means and including thermostatic means responsive to the temperature of the mixture and mechanically connected to said inlet valve means, for regulating the regular rates of flow of the fluids into said housing; outlet valve means operable by the mixture for regulating flow of the mixture through said by-pass and service outlets; and control valve means mechanically connected to and actuable by said thermostatic means for regulating flow of the mixture to said outlet valve means to control the operation thereof.

4. A device as defined in claim 2, including service valve means for regulating flow of the mixture.

5. In a device for mixing fluids of different temperatures and for controlling the temperature of a mixture of the fluids, the combination of: a housing provided with a mixing chamber therein, and provided with inlets which communicate with said mixing chamber and which are adapted to conduct the fluids of different temperatures thereinto; movable valve means for regulating flow of the fluids of different temperatures into said mixing chamber; means responsive to the temperature of the mixture in said mixing chamber for regulating the position of said valve means to maintain the temperature of the mixture substantially constant at a predetermined value, said temperature-responsive means being adapted to expand to move said valve means in response to an increase in the temperature of the mixture, and being adapted to expand an initial amount before moving said valve means; and means for adjusting the predetermined temperature value at which the mixture is maintained by said temperature-responsive means, said temperature-adjusting means being adapted to vary said initial amount of expansion of said temperature-responsive means.

6. A device as defined in claim 5, wherein said temperature-adjusting means includes stop means for limiting said initial amount of expansion of said temperature-responsive means, and includes means for varying the position of said stop means.

7. In a shower valve, the combination of: a housing having inlets for hot and cold water, and having by-pass and service outlets for a mixture thereof; inlet valve means for regulating flow of the hot and cold water through said inlets; means responsive to the temperature of the mixture for regulating the operation of said inlet valve means to maintain the mixture temperature at a predetermined value, said temperature-responsive means being connected to said inlet valve means; outlet valve means for regulating flow of the mixture through said by-pass and service outlets; and control valve means for regulating the operation of said outlet valve means so that said outlet valve means delivers the mixture through said by-pass outlet when the temperature of the mixture differs from said predetermined value thereof by more than a predetermined amount, and delivers the mixture through said service outlet when the mixture temperature differs from said predetermined value by less than said predetermined amount, said control valve means being in mechanically operative relationship with said temperature responsive means and being movable to an open position thereby to apply the pressure of the mixture to said outlet valve means to operate it when the mixture temperature differs from said predetermined value by less than said predetermined amount.

8. In a device for controlling flow of a fluid, the combination of: a housing provided with bypass and service outlets for the fluid; outlet valve means movable by fluid pressure applied to an area thereof from a first position wherein it closes said service outlet and opens said bypass outlet to a second position wherein it opens said service outlet and closes said by-pass outlet; control valve means for applying fluid pressure to said area of said outlet valve means; thermostatic means exposed to the fluid and connected to said control valve means for operating said control valve means to apply fluid pressure to said area of said outlet valve means in response to an increase in the temperature of the fluid to a predetermined value; and restricted passage means for slowly bleeding off the fluid pressure applied to said area of said outlet valve means.

9. In a device of the character described, the combination of: housing means providing first and second outlets for a fluid mixture; spaced first and second valve seats respectively encompassing said first and second outlets; an outlet valve movable between a first position wherein it is seated on said first valve seat to close said first outlet and a second position wherein it is seated on said second valve seat to close said second outlet, said outlet valve being movable from said first position to said second position by a fluid-pressure-force differential impressed thereacross; means for normally biasing said outlet valve toward said first position; means responsive to the temperature of the fluid mixture for impressing a fluid-pressure-force differential across said outlet valve to move it from said first position to said second position whenever the temperature of the fluid mixture rises above a predetermined value, the means last defined including a control valve movable to an open position to impress said fluid-pressure-force differential across said outlet valve, and including a thermostat exposed to the temperature of the fluid mixture and connected to said control valve for moving said control valve to its open position whenever the temperature of the fluid mixture rises above said predetermined value; and restricted passage means for reducing said fluid-pressure-force differential slowly whenever the temperature of the fluid mixture falls below said predetermined value.

10. In a device for mixing a fluid of relatively low temperature and a fluid of relatively high temperature, the combination of: housing means providing a mixing chamber and providing high-temperature and low-temperature inlets which communicate with said mixing chamber and which are respectively adapted to conduct the high-temperature and low-temperature fluids to said mixing chamber; mixing valve means in said housing means for regulating the relative rates of flow of the high-temperature and low-temperature fluids into said mixing chamber, said mixing valve means including a mixing valve which is movable between a first position wherein it opens said high-temperature inlet and closes said low-temperature inlet and a second position wherein it closes said high-temperature inlet and opens said low-temperature inlet; means for biasing said mixing valve toward said first position; means in said housing means responsive to fluid temperature variations in said mixing chamber for moving said mixing valve from said first position toward said second position in response to an increase in the fluid temperature in said mixing chamber to a value higher than a predetermined minimum value, said biasing means retaining said mixing valve in said first position when the fluid temperature in said mixing chamber is lower than said minimum value, said means responsive to fluid temperature variations including a thermostat exposed to the fluid temperature in said mixing chamber, said thermostat having one end connected to said mixing valve and having a free end; and a stop carried by said housing means and engageable by said free end of said thermostat as the fluid temperature in said mixing chamber attains said minimum value.

11. In a device for mixing a fluid of relatively low temperature and a fluid of relatively high temperature, the combination of: housing means providing a mixing chamber and providing high-temperature and low-temperature inlets which communicate with said mixing chamber and which are respectively adapted to conduct the high-temperature and low-temperature fluids to said mixing chamber, said housing means also providing by-pass and service outlets for a mixture of the high-temperature and low-temperature fluids; mixing valve means in said housing means for regulating the relative rates of flow of the high-temperature and low-temperature fluids into said mixing chamber, said mixing valve means including a mixing valve which is movable between a first position wherein it opens said high-temperature inlet and closes said low-temperature inlet and a second position wherein it closes said high-temperature inlet and opens said low-temperature inlet; thermostat means in said housing means and responsive to fluid temperature variations in said mixing chamber for moving said mixing valve from said first position toward said second position in response to an increase in the fluid temperature in said mixing chamber to a value higher than a predetermined minimum value so as to reduce the rate of flow of the high-temperature fluid and to increase the rate of flow of the low-temperature fluid into said mixing chamber; outlet valve means movable by fluid pressure in said mixing chamber applied to an area thereof from a by-pass position wherein it closes said service outlet and opens said by-pass outlet to a service position wherein it opens said service outlet and closes said by-pass outlet; control valve means movable from a closed position to an open position to expose said area of said outlet valve means to fluid pressure in said mixing chamber; and a lost-motion connection between said thermostat means and said control valve means, said lost-motion connection opening said control valve means when the fluid temperature in said mixing chamber differs from said minimum value by less than a predetermined amount.

12. The device defined in claim 11 including restricted passage means communicating with said area of said outlet valve means for slowly bleeding off the fluid pressure applied to said area of said outlet valve means.

WALTER L. VINSON.

REFERENCES CITED

The following references are of record in the file of this patent:

UNITED STATES PATENTS

| Number | Name | Date |
| --- | --- | --- |
| 1,000,435 | Pagelsen | Aug. 15, 1911 |
| 1,223,079 | Lammert | Apr. 17, 1917 |
| 1,439,750 | Nelson | Dec. 26, 1922 |
| 1,611,650 | Lawler | Dec. 21, 1926 |
| 1,707,109 | Blair | Mar. 26, 1929 |
| 1,860,189 | Lawler | May 24, 1932 |
| 1,954,903 | Walker | Apr. 17, 1934 |
| 1,990,653 | Kollsman | Feb. 12, 1935 |
| 2,086,129 | Hamilton | July 6, 1937 |
| 2,172,489 | Young | Sept. 12, 1939 |
| 2,250,815 | Ruegg | July 29, 1941 |
| 2,457,618 | Wiesendanger | Dec. 28, 1948 |

Certificate of Correction

Patent No. 2,569,838                                           October 2, 1951

WALTER L. VINSON

It is hereby certified that error appears in the printed specification of the above numbered patent requiring correction as follows:

Column 1, line 14, after the word and comma "Regulator," insert a closing quotation mark; column 11, line 65, for "ratatable" read *rotatable*; column 17, line 18, for "regular" read *relative*;

and that the said Letters Patent should be read as corrected above, so that the same may conform to the record of the case in the Patent Office.

Signed and sealed this 15th day of January, A. D. 1952.

[SEAL]

THOMAS F. MURPHY,
*Assistant Commissioner of Patents.*